United States Patent [19]

Vugrin

[11] 4,130,372
[45] Dec. 19, 1978

[54] GUIDE BUSHING FOR ROTARY TOOL

[76] Inventor: Augustin Vugrin, 16645 Martha Dr., Brookfield, Wis. 53005

[21] Appl. No.: 791,235

[22] Filed: Apr. 27, 1977

[51] Int. Cl.² ............................................. B23B 49/00
[52] U.S. Cl. ................................ 408/72 R; 308/3 A; 408/115 B; 408/241 B
[58] Field of Search ............... 308/3 A, 3.9, 6 A, 6 B, 308/8; 408/72 R, 72 B, 113, 115 B, 241 R, 241 B, 230

[56] References Cited

U.S. PATENT DOCUMENTS

| 354,155 | 12/1886 | Libbey | 408/230 |
|---|---|---|---|
| 1,782,284 | 11/1930 | Betancourt | 408/72 R |
| 2,477,891 | 8/1949 | O'Neill | 408/113 |
| 2,491,635 | 12/1949 | Allen | 408/72 R |
| 2,510,203 | 6/1950 | Andreasson | 408/72 R |
| 2,881,644 | 4/1959 | Conner | 408/241 B |
| 3,301,102 | 1/1967 | DeLara | 408/72 R |

Primary Examiner—Trygve M. Blix
Assistant Examiner—Charles E. Frankfort
Attorney, Agent, or Firm—Andrus, Sceales, Starke & Sawall

[57] ABSTRACT

A rotary tool assemblage includes an axially movable rotary tool and apparatus for holding a workpiece for engagement by the tool. A guide bushing is rotatably supported and interposed between the tool and the workpiece to guide and pilot the tool. The guide bushing and tool are rotationally interlocked to preclude relative rotational movement therebetween.

2 Claims, 7 Drawing Figures

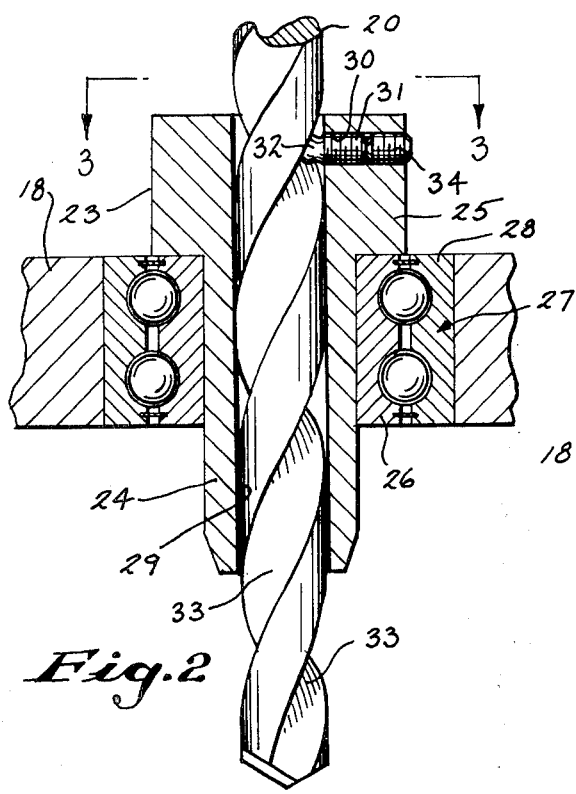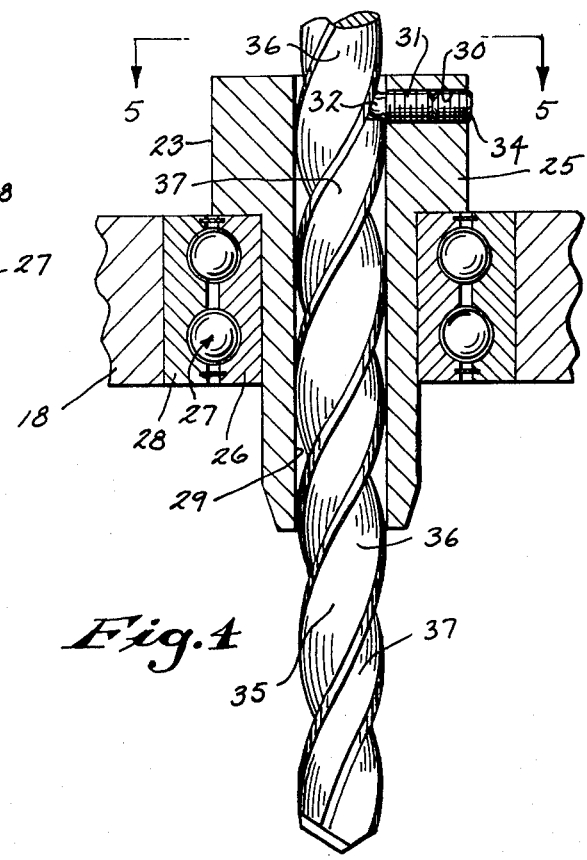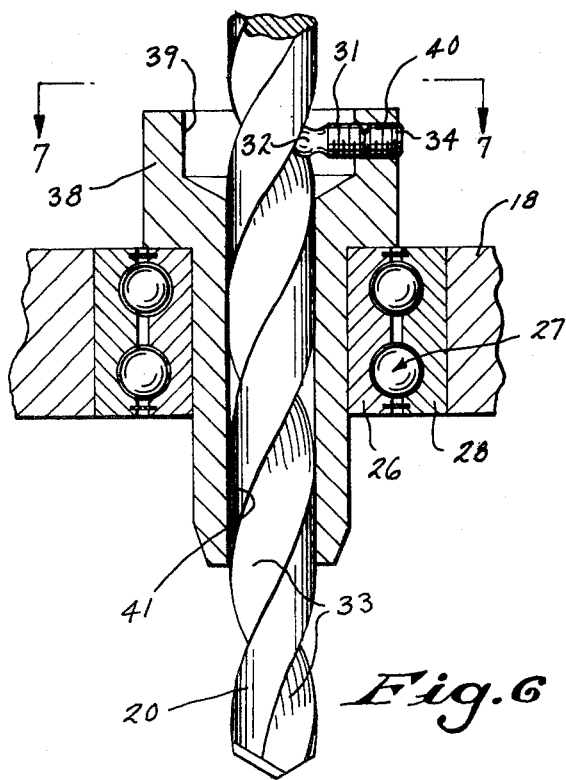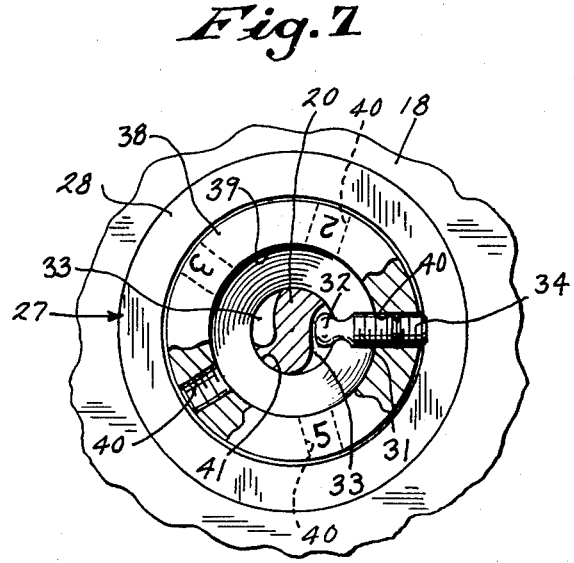

GUIDE BUSHING FOR ROTARY TOOL

BACKGROUND OF THE INVENTION

This invention relates to guide bushings and more particularly to such bushings of the rotary variety.

Bushings are commonly employed for guiding and piloting rotary tools in repetitive production processes. Most commonly, bushings for drilling, boring, reaming, etc. are fixed relative to their holding or supporting fixture and the tool or spindle. Because of the heat and wear resulting from vibration and friction between the tool and the bushing, such bushings are generally made of hard alloy or special steels or even lined with carbide materials which makes them relatively expensive. The fixed bushings also generally require the use of liquid coolants for lubrication and to dissipate some of the heat generated between the tool and bushing. In spite of their fabrication from special and expensive materials and the use of coolants, the fixed bushings render tools relatively short-lived and are themselves relatively short-lived.

An alternative to the fixed bushing is the rotary bushing wherein the bushing is mounted in a ball, roller or needle bearing and is allowed to rotate with the tool. Even here, however, considerable heat and wear results between the tool and bushing due to relative movements vertically and upon acceleration and deceleration of the tool.

It is generally an object of this invention to rotationally lock the tool and rotary bushing together to preclude relative rotation therebetween and thereby minimize problems resulting from heat and wear. Such an interlock therebetween greatly extends the life of the tool and the bushing without special cooling and even when the bushing is fabricated from less expensive and/or softer materials.

SUMMARY OF THE INVENTION

The invention generally relates to a rotary tool assemblage including an axially movable rotary tool. The assemblage further includes means for holding a workpiece for engagement by said tool in a predetermined manner. A guide bushing is spaced from the workpiece to guide and pilot the tool. Means are provided for rotationally supporting the guide bushing. And means are further provided to rotationally interlock the guide bushing and the tool to preclude relative rotational movement therebetween.

According to a further aspect of the invention, the tool comprises a drill having two sets of diametrically opposed flutes. One set of diametrically opposed flutes provides the cutting edges for the drill and provides for the removal of chip material. The other set of flutes is engageable by the means for rotationally interlocking the drill and its rotatable guide bushing. Since the means for rotationally interlocking the drill and guide bushing remain clear of the chip removal flutes, and chip material entering the bushing can pass through the bushing unhindered by the interlocking means.

DESCRIPTION OF THE DRAWING FIGURES

The drawings furnished herewith illustrate the best mode presently contemplated for carrying out the invention and as described hereinafter.

In the drawings

FIG. 2 is an enlarged sectional elevation of a drill along with the drill bushing of this invention;

FIG. 4 is a sectional elevation generally similar to that of FIG. 2 and shows a drill specially adapted for use with the drill bushing of this invention;

FIG. 6 is a sectional elevation generally similar to that of FIG. 2 and shows a further embodiment of the drill bushing of this invention; and FIG. 7 is a sectional view taken generally on line 7—7 of FIG. 6.

DESCRIPTION OF THE ILLUSTRATED EMBODIMENTS

Figure 1:
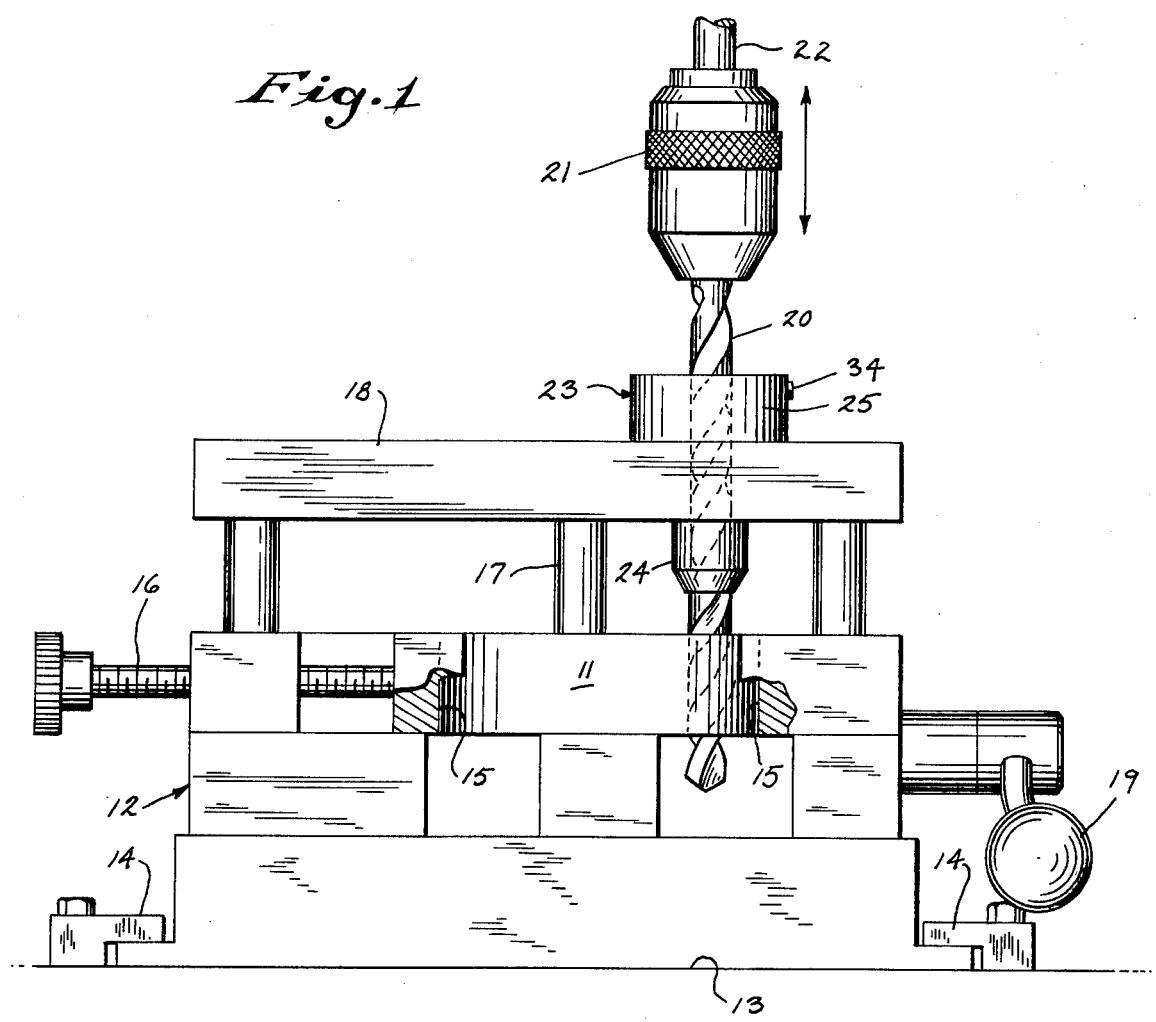
FIG. 1 is an elevational view illustrating a drilling operation utilizing the drill bushing of this invention.

Referring to the drawings, a workpiece 11 is disposed in a production fixture 12 secured on the table 13 of a drill press or the like by a plurality of hold-down members 14. The workpiece 11 is disposed in a suitable cavity 15 of the fixture 12 where it is secured horizontally by the movable threaded member 16 and vertically by the depending rod 17 carried by the vertically movable clamping member 18 which is actuated by the lever 19. A rotary tool such as the drill 20 is secured in a suitable chuck 21 and carried by the vertically movable spindle 22. In service, the rotating cutting drill 20 is advanced downwardly through the guide bushing 23 secured in the clamping member 18 of the fixture 12 toward and through at least some portion of the workpiece 11 in a predetermined manner. If necessary or desired, a coolant, not shown, may be directed against the juncture of the drill 20 with the workpiece 11 to dissipate some of the heat generated by the cutting operation.

The guide bushing 23 of this invention comprises a sleeve 24 having an external radial flange 25 at the upper end thereof which seats upon the inner race 26 of the sealed double ball bearing unit 27 as generally shown in FIG. 2. The sleeve 24 is received within the bearing unit 27 with a slight press fit and the outer race 28 of bearing unit in turn is secured relative to the clamping member 18. When the flange 25 of the bushing 23 is properly seated on the bearing unit 27, the sleeve 24 may project below the lower surface of the bearing as desired.

The guide bushing 23 is provided with a machined through bore 29 which receives the drill 20 with a precision fit to generally preclude vibration with consequent wear therebetween. The flange 25 of bushing 23 is provided with at least one radially extending, threaded through hole 30 for receiving the set screw 31. When the set screw 31 is properly positioned in the hole 30, the head 32 thereof projects into the bore 29 where it engages within a spiral groove or flute 33 of the drill 20. The engagement of the set screw 31 with the drill 20 rotationally interlocks the drill and guide bushing 23 but permits relative movement vertically therebetween so that the tool can be advanced relative to the bushing to perform a cutting operation and then be retracted. The set screw 31 may be secured or locked in place by the lock screw 34.

In a cutting operation, the bushing 23, being rotationally interlocked with the drill 20, always rotates therewith so that friction and wear therebetween is greatly minimized. It is contemplated that in the fully retracted position of drill 20, at least a portion of the drill will remain within the confines of the bushing 23 so that the rotational interlock will remain intact in contemplation of the next cutting operation.

In a production situation, the repetitive vertical movements of the drill 20 relative to the bushing 23 may in time wear a spiral groove in the wall of bore 29 which may affect the accuracy of the cutting operation. When such possible inaccuracy is suspected or evidenced in the workpiece 11, correction is possible by rotationally repositioning the drill 20 relative to the bushing 23. To provide for such relative repositioning, the flange 25 of the bushing 23 may be provided with a plurality of circumferentially spaced, radially extending, threaded holes 30 for receiving the set screw 31. To effect a repositioning of the drill 20 relative to the bushing 23, the set screw 31 is moved to another hole 30. The holes 30 may be numbered or otherwise denoted as generally shown in FIG. 3 so that a machinist can readily keep track of the holes to be avoided and those yet available.

Figure 3:
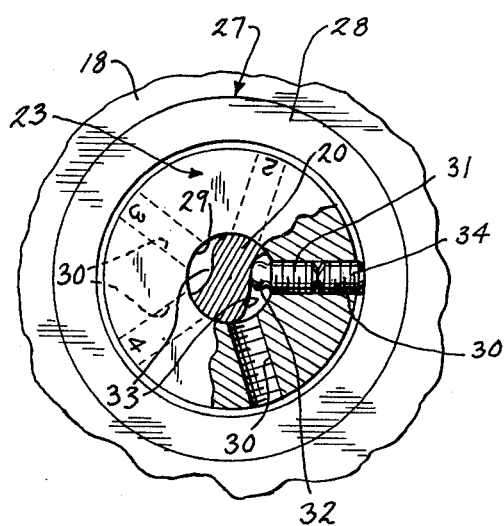
FIG. 3 is a sectional view taken generally on the line 3—3 of FIG. 2.

According to FIG. 3, five holes 30 are shown to be equidistantly spaced circumferentially. For the drill 20 having two flutes as shown in FIGS. 2 and 3, other odd multiples of holes 30 can also be selected and will avoid placing the holes in diametrically opposed relation. For drills having additional flutes, the pattern for holes 30 must be different so that the locations for the set screw 31 will in fact reposition the drill relative to the corresponding bushing to avoid possible grooves worn into the wall of the bore of the bushing at earlier used set screw positions.

While the hard steels and other expensive materials traditionally used for earlier guide bushings may be employed for the bushings 23 of this invention, they are generally not necessary. Because friction and wear are greatly minimized between the drill 20 and bushing 23, relatively softer, more conventional and less expensive steels can be employed for the bushings. The reduction in friction and resulting heat also generally eliminates the need for cooling and lubricating the bushings 23 of this invention. With the drill 20 rotationally interlocked with the bushing 23 of this invention to minimize the problems of friction, heat and wear, the working life of both the drill and the bushing is substantially increased. The possible use of less expensive materials for the bushing 23, and the elimination of the need for cooling of the bushing, and the extended working life of both the tool and bushing will effect a substantial saving in rotary tool production operations.

Figure 5:
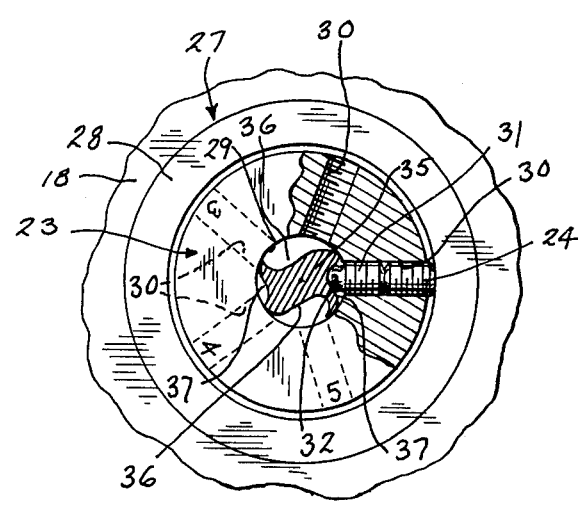
FIG. 5 is a sectional view taken generally on line 5—5 of FIG. 4.

Referring now to FIGS. 4 and 5 of the drawings, the drill 35 is shown to have four spiral flutes comprising two diametrically opposed pairs. The diametrically opposed, relatively large flutes 36 provide the cutting edges of drill 35 and provide for chip removal. The intermediate diametrically opposed, relatively small flutes 37 are for engagement by the set screws 31 to rotationally interlock the drill 35 and the guide bushing 23.

Under most circumstances the guide bushing 23 is spaced sufficiently from the workpiece 11 so that the chip material removed from the workpiece and moving along the flutes 36 will fall away from the drill 35 between the workpiece and bushing. On occasion, however, the chip material may remain in the flutes 36 and be carried into the bushing 23. With the drill 35, any chip material carried into the bushing 23 passes through the bushing unhindered because the set screw 31 projecting into the bore 29 engages in the separate and clear flutes 37. The small flutes 37 can serve still another function in that they can carry a coolant directed onto the workpiece 11 to the cutting area to lubricate and dissipate heat along the cutting surface.

According to FIGS. 6 and 7 of the drawings, still another embodiment is shown wherein the chip material can pass generally unhindered through a guide bushing. The guide bushing 38 in FIGS. 6 and 7 is provided with a recess or enlarged bore portion 39 at the entry end thereof for the drill 20 having a pair of flutes 33. The set screw 31 is secured in the radially extending threaded opening 40 of the bushing 38 and projects into the recess or enlarged bore portion 39 for engagement with one of the flutes 33 to rotationally interlock the drill 20 and the bushing 38. The location of the engagement between the set screw 31 and the drill 20 is spaced from the smaller bore 41 of the bushing 38 wherein the drill is received with a precision fit. If chip material removed by the cutting operation is carried into the bushing 38 by the flute 33 engaged by set screw 31, the recess or enlarged bore portion 39 serves to provide relief as the chip material is deflected out of the flute by the set screw. Any chip material in the other or diametrically opposed flute 33 of course passes through the bushing 38 unhindered.

Various modes of carrying out the invention are contemplated as being within the scope of the following claims particularly pointing out and distinctly claiming the subject matter which is regarded as the invention.

I claim:

1. In a rotary tool assemblage, an axially movable rotary tool having flutes, means for holding a workpiece for engagement by said tool in a predetermined manner, a guide bushing rotatably supported and interposed between the tool and the workpiece, said bushing having a bore to guide and pilot the tool in the direction of the workpiece, said bore in the guide bushing being enlarged at the entry end thereof to provide a shoulder spaced from said end, and set screw means to rotationally interlock the guide bushing and tool while providing for relative axial movement therebetween, said set screw means being secured in the bushing and projecting into the enlarged bore portion for engagement within one of the flutes of the tool in spaced relation from the shoulder, said enlarged bore portion serving to provide relief for any chip material carried by the flutes of the tool into the guide bushing and deflected by the interlocking set screw means.

2. For use in a rotary tool assemblage having an axially movable rotary tool for drilling, reaming, boring or the like, a rotatable guide bushing having a bore to guide and pilot the tool in the direction of a workpiece, said bore in the guide bushing being enlarged at the entry end thereof to provide a shoulder spaced from said end, and a set screw to rotationally interlock the guide bushing and the tool while providnng for relative axial movement therebetween, the set screw being secured in the bushing and projecting into the enlarged bore portion for engagement with the tool in spaced relation from the shoulder, said enlarged bore portion serving to provide relief for any chip material carried into the guide bushing and deflected by the interlocking set screw.

* * * * *